(12) United States Patent
Venkatraman et al.

(10) Patent No.: US 9,331,922 B2
(45) Date of Patent: May 3, 2016

(54) AUTOMATIC RECOVER AFTER LOSS OF SIGNAL EVENT IN A NETWORK DEVICE

(75) Inventors: Vivek Venkatraman, Irvine, CA (US); Magesh Valliappan, Austin, TX (US)

(73) Assignee: Broadcom Corporation, Irvine, CA (US)

( * ) Notice: Subject to any disclaimer, the term of this patent is extended or adjusted under 35 U.S.C. 154(b) by 559 days.

(21) Appl. No.: 13/571,964

(22) Filed: Aug. 10, 2012

(65) Prior Publication Data

US 2014/0043957 A1    Feb. 13, 2014

(51) Int. Cl.
*H04L 1/00* (2006.01)
*H04L 12/26* (2006.01)
*H04L 12/24* (2006.01)

(52) U.S. Cl.
CPC ........ *H04L 43/0811* (2013.01); *H04L 41/0672* (2013.01)

(58) Field of Classification Search
CPC .................................................. H04L 41/0672
USPC ........................................................ 370/216
See application file for complete search history.

(56) References Cited

U.S. PATENT DOCUMENTS

| | | | |
|---|---|---|---|
| 6,504,630 B1 * | 1/2003 | Czarnocha et al. | 398/15 |
| 6,603,741 B1 * | 8/2003 | Poulter et al. | 370/252 |
| 6,915,127 B2 * | 7/2005 | Sakuma | 455/423 |
| 7,010,607 B1 * | 3/2006 | Bunton | H04L 1/24 709/228 |
| 7,428,354 B2 * | 9/2008 | Miyazaki | 385/24 |
| 7,957,643 B2 * | 6/2011 | Feldman et al. | 398/30 |
| 8,638,783 B2 * | 1/2014 | Wagh | G06F 13/385 370/359 |
| 2004/0190499 A1 * | 9/2004 | Chen et al. | 370/352 |
| 2005/0237926 A1 * | 10/2005 | Cheng et al. | 370/216 |
| 2007/0008898 A1 * | 1/2007 | Sharma et al. | 370/252 |
| 2010/0075613 A1 * | 3/2010 | Brown et al. | 455/69 |
| 2010/0077097 A1 * | 3/2010 | Brown et al. | 709/233 |
| 2010/0150547 A1 * | 6/2010 | Xia et al. | 398/13 |

FOREIGN PATENT DOCUMENTS

| | | | |
|---|---|---|---|
| CN | 101848165 A | 9/2010 | |
| EP | 1003300 | 5/2000 | |
| EP | 1003300 A2 * | 5/2000 | ........... H04B 10/155 |
| KR | 10-0632975 | 10/2006 | |

* cited by examiner

*Primary Examiner* — Guang Li
(74) *Attorney, Agent, or Firm* — Brinks Gilson & Lione

(57) ABSTRACT

A switch device can identify when a loss of signal event occurs on a communication link connecting a local link partner and a remote link partner. The switch device may automatically perform a link restart process to restore communication with the remote link partner without performing a speed negotiation with the remote link partner. The link restart process may include disabling a transmitter for a recovery duration and configuring a transmitter and a receiver to an initial configuration state. The link restart process may also synchronize the start of a training protocol communication between the local link partner and remote link partner. The switch device may also perform the link restart process when traffic received from the remote link partner fails a link criteria.

20 Claims, 7 Drawing Sheets

AUTOMATIC RECOVER AFTER LOSS OF SIGNAL EVENT IN A NETWORK DEVICE

TECHNICAL FIELD

This disclosure relates to network devices such as a switch. This disclosure also relates to synchronizing recovery of a connection between network link partners after a loss of signal.

BACKGROUND

Rapid advances in electronics and communication technologies, driven by immense user demand, have resulted in vast interconnected networks of computing devices capable of exchanging immense amounts of data. For example, Local Area Networks (LANs) may connect hundreds or thousands of computing devices in a single network. Perhaps the best known example of such interconnection of computing devices is the Internet, which continues to expand with each passing day. As technology continues to advance and interconnected communication networks grow in size and frequency of use, there is an increasing incentive to send and receive data more efficiently.

BRIEF DESCRIPTION OF THE DRAWINGS

The innovation may be better understood with reference to the following drawings and description. In the figures, like reference numerals designate corresponding parts throughout the different views.

DETAILED DESCRIPTION

The discussion below makes reference to network devices. A network device may be, as one example, a switch or any other device that handles network traffic. A network device that incorporates the techniques described below may include, as examples, a switch, hub, router, gateway, network bridge, blade server, or any other type of network device. A switch may also be implemented as a connected system of multiple switching devices arranged in any physical architecture, such as in a Top-of-Rack (TOR) design or End-of-Row design. A switch may include any number of point-to-point connections within the switch device to route data between devices communicatively coupled to the switch device.

Figure 1:
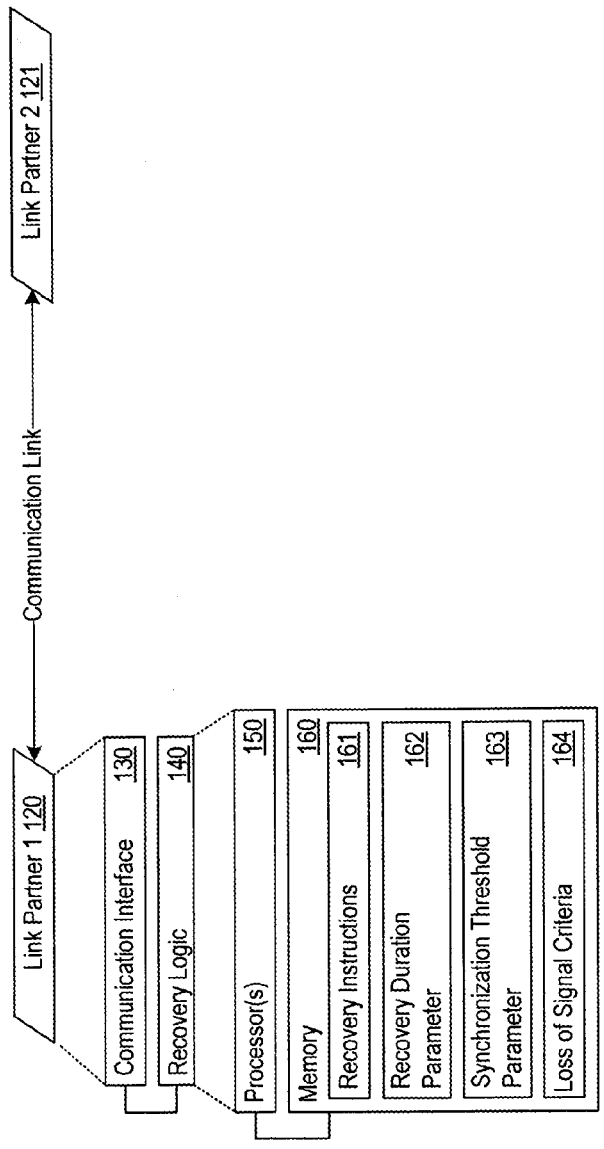
FIG. 1 shows an example of a system for automatic recovery of a communication link after a loss of signal.

FIG. 1 shows an example of a system 100 for automatic recovery of a communication link after a loss of signal (LOS) that may be incorporated into any network device, such as a switch. The system 100 shown in FIG. 1 includes two link partners labeled as link partner 1 120 and link partner 2 121. A link partner may refer to any end of a communication link in the switch device. For example, a link partner may be a Serializer/Deserializer (SerDes) device implemented as part of the switch device.

The link partners 120-121 may communicate through a communication link in the switch device. The communication link between link partner 1 121 and link partner 2 121 may be implemented in any number of ways and may include multiple elements, such as a switching fabric or a backplane. As one example, the communication link may be a dedicated link between the two link partners 120 and 121. In one implementation, the link partners 120-121 may be connected via a full duplex link in which a transmitter of link partner 1 120 is physically connected to a receiver in link partner 2 121 through a dedicated communication line. A transmitter of link partner 2 121 may be physically connected to a receiver of link partner 1 120 via the same or a separate dedicated communication line. The link partners 120-121 may communicate any type of data through the communication link. Examples of data the link partners 120-121 may communicate include Internet Protocol (IP) data such as packets according to any IP communication protocol, cellular data such as voice data, or other types of data.

Link partner 1 120 may include a communication interface 130 and recovery logic 140. In one implementation, the recovery logic 140 includes one or more processors 150 and a memory 160. The memory 160 may include recovery instructions 161, a recovery duration parameter 162, a synchronization threshold parameter 163, and loss of signal criteria 164. As described in greater detail below, the recovery logic 140 may identify a loss of signal event, and in response automatically perform a link restart process to restore the communication link with a link partner (e.g., link partner 2 121) without performing a speed negotiation with the link partner. In this way, the link partners may coordinate a link restart without exchanging control information, e.g., each enter into an initial transmit and receive state upon identifying a LOS event.

Figure 2:
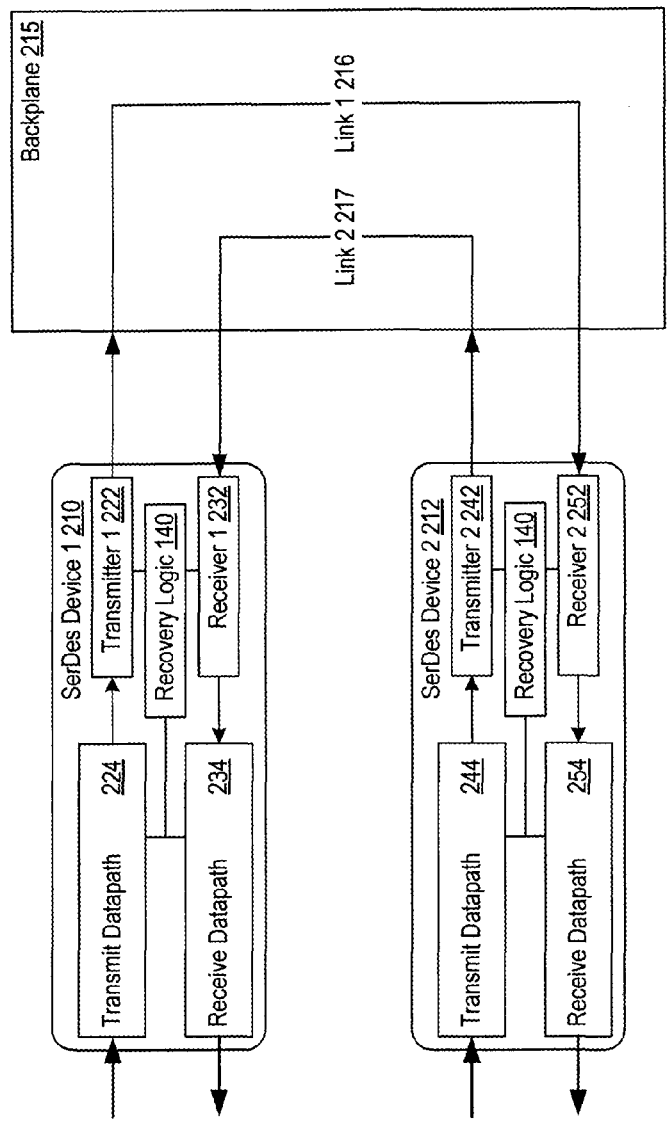
FIG. 2 shows an example of a system for automatic recovery of a communication link after a loss of signal.

FIG. 2 shows an example of a system 200 for automatic recovery of a communication link after a loss of signal. The system 200 may be implemented as part of a switch or other network device. The exemplary system 200 shown in FIG. 2 includes two link partners labeled as SerDes device 1 210 and SerDes device 2 212. The SerDes devices 210 and 212 may be remote link partners, such as when the SerDes devices are implemented as separate logical or physical devices in the switch device. For instance, the SerDes devices 210 and 212 may be implemented on separate fabric cards, switches, blade servers, Systems on a Chip (SoCs), or other devices or circuits within a switching system. However, the remote link partners may be remote in the sense that they are connected together over larger distances than inside a single switch, such as when the link partners are different switch devices connected across the Internet. Remote link partners may be connected through a full duplex link. As seen in FIG. 2, the backplane 215 implements a full duplex link between SerDes device 1 and SerDes device 2 that includes communication link 1 216 and communication link 2 217. Communication links 1 and 2 may be implemented as physical connections, for example, through copper wiring, cabling (e.g., Ethernet cable), or any other form of physical connection.

A link partner, e.g., a SerDes device, may include a transmitter and a receiver for communicating with a remote link partner. The SerDes device 1 210 may include transmitter 1 222 and a transmit datapath 224 for sending data to SerDes device 2 212. The transmit datapath 224 in SerDes device 1 may include any amount of logic to process data to be sent to SerDes device 2 212, such as a Serializer or other logic. As seen in FIG. 2, SerDes device 1 210 may send data through transmitter 1 222 to receiver 2 252 of SerDes device 2 212 through communication link 1 216.

SerDes device 1 210 may also include receiver 1 232 and a receive datapath 234 for data received from SerDes device 2 212. The receive datapath 234 in SerDes device 1 may include any amount of logic to process data received from SerDes device 2 212, such as a Deserializer or other logic to verify the integrity of the received data. For example, the receive datapath 234 may include logic to identify whether the received data violates a predetermined communication protocol, whether the data meets any number of quality criteria, or other logic. SerDes device 1 210 may receive data through receiver 1 232 from transmitter 2 242 of SerDes device 2 212 through communication link 2 217. SerDes device 2 212 may include similar elements as SerDes device 1 210, such as transmitter 2 242, a transmit datapath 244, receiver 2 252, and a receive datapath 254.

A link partner may implement recovery logic 140 to automatically reestablish a communication link with a remote link partner upon identifying a loss of signal event. In FIG. 2, SerDes device 1 210 includes recovery logic 140 that may automatically recover a communication link with SerDes device 2 212 after identifying a loss of signal event. A loss of signal event may be defined by the recovery logic 140 according to any number of predetermined criteria, such as the loss of signal criteria 164. The recovery logic 140 may define a LOS event to encompass any loss or significant change in signal quality to warrant a restart or reconfiguration of the communication link. As examples, the recovery logic 140 may identify a loss of signal event when a signal amplitude, signal shape, signal timing, signal dispersion parameter, or other signal parameter values exceed one or more predetermined criteria thresholds. The recovery logic 140 obtain an LOS event indication from any number of circuitry in a receive datapath that identifies any of the above-numerated changes to a data signal received from a remote link partner.

In one example, the recovery logic 140 may also identify a loss of signal when a receiver of the SerDes device has not received data from the remote link partner for more than a signal loss timing threshold. Or, the recovery logic 140 may identify a signal loss event when the communication link, e.g., link 1 216, is in a high-impedance state or other physical state that indicates lack of activity. A high impedance state may occur on a communication link when a remote link partner stops sending data cross the communication line, e.g., when the link partner is powered down or restarting and stops driving a signal on the communication line.

A loss of signal event may be caused, for example, by any interruption on the data stream transmitted to a link partner, such as one that exceeds an interruption threshold in duration. As examples, the recovery logic 140 of SerDes device 1 may identify a loss of signal event when SerDes device 2 restarts or when an interruption occurs in the data stream sent from SerDes device 2 to SerDes device 1. An interruption may result from, as examples, a physical disturbance in a communication channel or a power supply glitch. In one implementation, the recovery logic 140 may identify a signal loss event by monitoring 1) the data received from a remote link partner (or lack thereof), 2) the communication link itself, 3) the receiver receiving the data from the remote link partner, or any combination thereof. The recovery logic 140 may respond to the LOS event by automatically performing a signal restart process to restore communication with a remote SerDes device without signaling the remote link partner and without performing a speed negotiation with the remote SerDes device.

As an illustrative example, a loss of signal may occur on communication link 2 217 for any number or reasons, e.g., when SerDes device 2 212 restarts upon detecting protocol errors in received data. The recovery logic 140 of SerDes device 1 210 may identify the loss of signal event occurring on communication link 2 217. In response, the recovery logic 140 may automatically initiate a link restart process. In one implementation, the recovery logic 140 of SerDes device 1 210 may disable transmitter 1 222, e.g., by forcing transmitter 1 222 into an idle state. The recovery logic 140 may disable a transmitter for a recovery duration before re-enabling the transmitter. In one implementation, the recovery logic 140 of SerDes device 1 210 may configure a recovery timer to expire after a predetermined recovery duration. The predetermined recovery duration may be set to ensure a proper reconfiguration of the communication link. For example, the predetermined recovery timer may be long enough to clear any residual data on the communication line, e.g., the communication link 2 217. In one implementation, the predetermined recovery duration may be 70 milliseconds (ms). Alternatively, the predetermined recovery duration be set as any value within a 20% margin of 70 ms.

While transmitter 1 222 is disabled, SerDes device 1 210 may cease sending data across communication link 1 216, causing communication link 1 216 to enter a high impedance state. The recovery logic 140 of SerDes device 2 212 may identify the high impedance state of communication link 2 217 as a loss of signal event. In response, the recovery logic 140 of SerDes device 2 212 may disable transmitter 2 242 for a predetermined recovery duration as well, e.g., 70 ms. After the predetermined recovery duration has elapsed, the recovery logic 140 of each SerDes device 210-212 may re-enable their respective transmitters, e.g., transmitter 1 222 and transmitter 2 242. Thus, recovery logic 140 may perform a link restart process that includes disabling a transmitter for a recovery duration and enabling the transmitter after the recovery duration elapses.

After executing the link restart process, a link partner may perform a training protocol communication with a remote link partner to configure one or more communication link between the link partners, e.g., link 1 216 and link 2 217. A training protocol communication may include exchanging training and configuration parameters between link partners to configure a communication link. One example of a training protocol communication executed between link partners is described in Clause 72 of the IEEE 802.3 Ethernet standard (Clause 72), which describes an automated transmit equalization handshake protocol between link partners. The recovery logic 140 may allow for synchronized transmission of training protocol communications between the link partners once each respective transmitter has been enabled after the predetermined recovery duration has elapsed.

Performing a training protocol communication between link partners, e.g., sending and receiving Clause 72 frames, may require that the link partners be configured to communicate at a common speed prior to exchanging training protocol frames. In one implementation, the link partners of a switch device are separately configured to communicate at a common transfer speed. Thus, the recovery logic 140 may automatically recover a communication link from a loss of signal event without performing a speed negotiation with the remote link partner. Similarly, the recovery logic 140 may synchronize the performing of training protocol communications, e.g., clause 72 communications, without performing a speed negotiation with remote link partner.

Clause 73 of the IEEE 802.3 Ethernet standard (Clause 73) describes one example of a speed negotiation communication exchange. Clause 73 requires the exchange of Differential Manchester Encoding (DME) frames to negotiate a common communication speed between link partners. In contrast, the recovery logic 140 may support automatic recovery from a loss of signal event and synchronized start of training communications or link tuning without requiring additional hardware, state machines, or logic associated with performing speed negotiations between link partners. In some implementations, the recovery logic 140 recovers the link without the additional hardware, state machines, and logic to support exchange of DME frames. Also, while IEEE 802.3 Clause 73 is limited to a predetermined set of communicated rates, the recovery logic 140 may be implemented independent of the communication rate link partners communicate across. Likewise, Clause 73 defines an Ethernet compliance standard, whereas the recovery logic 140 may be implemented on a switch device that routes any type of data, e.g., non-Ethernet data. In other words, the recovery logic 140 may be implemented on IEEE 802.3 non-compliant devices.

Figure 3:
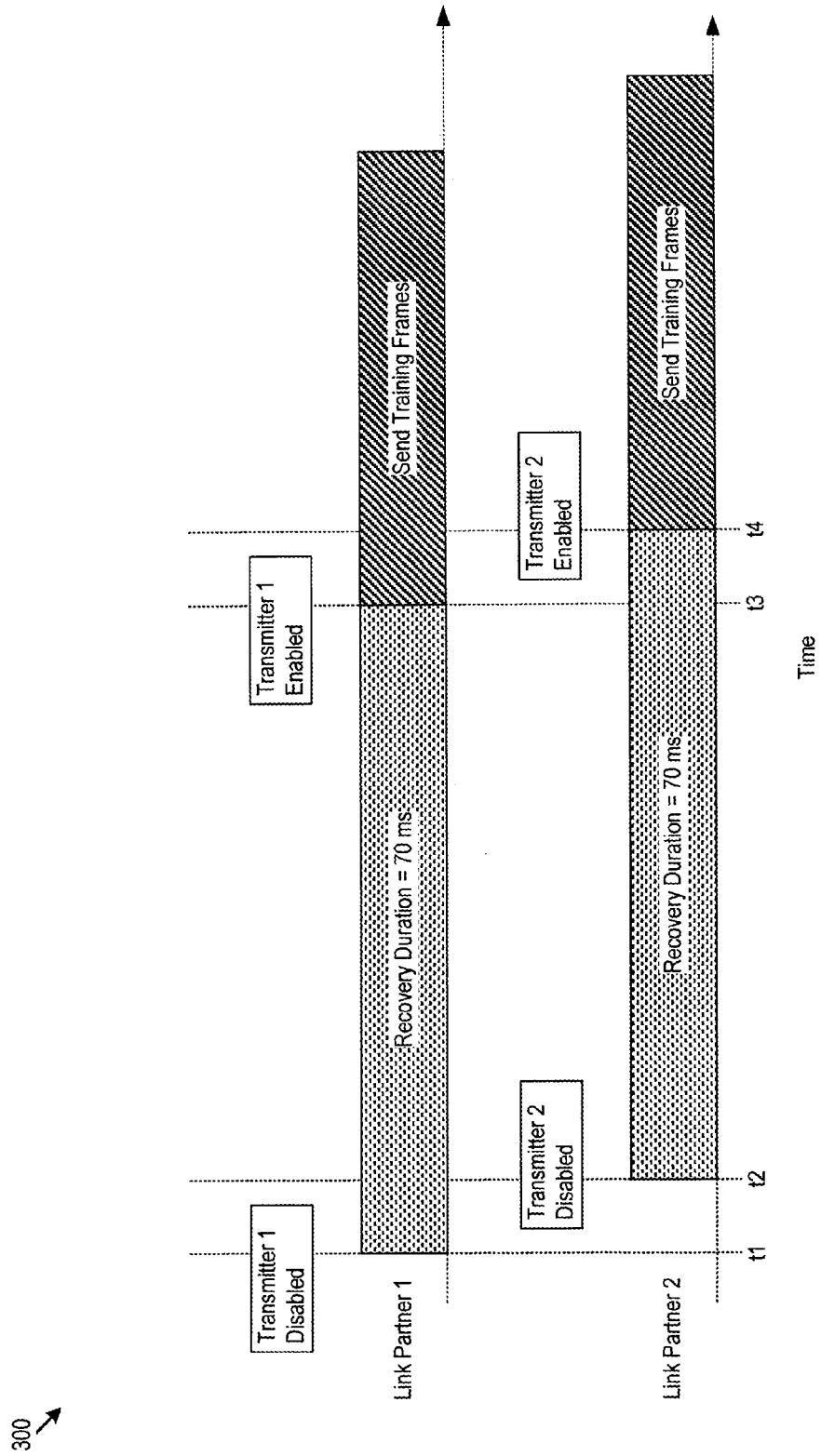
FIG. 3 shows a timing example of a synchronized start of performing a training protocol communication between link partners.

FIG. 3 shows a timing example 300 of a synchronized start of performing a training protocol communication between link partners. The timing example 300 shown in FIG. 3 includes a timeline for a first link partner labeled as Link Partner 1 and a second link partner labeled as Link Partner 2. Link Partner 1 may include a transmitter, e.g., transmitter 1. Likewise, Link Partner 2 may include a transmitter, e.g., transmitter 2.

Recovery logic 140 implemented in Link Partner 1 may identify a loss of signal event in a communication link through which Link Partner 1 receives data from Link Partner 2. In response, the recovery logic 140 of Link Partner 1 may disable a transmitter 1 in Link Partner 1, as shown at the time t1 in FIG. 3. Upon disabling of transmitter 1, a communication line through which Link Partner 1 transmits data to Link Partner 2 may enter a high impedance state. As such, recovery logic 140 implemented in Link Partner 2 may identify a loss of signal event. Upon identifying a loss of signal event, the recovery logic 140 of Link Partner 2 may disable a transmitter 2 in Link Partner 2, as seen at time t2 in FIG. 3.

Link Partners 1 and 2 may each disable their respective transmitter for a recovery duration period, e.g., 70 ms as seen in FIG. 3. Recovery logic 140 may re-enable a disabled transmitter after the recovery duration elapses. Thus, the recovery logic 140 of Link Partner 1 may enable transmitter 1 at time t3, which may be 70 ms after time t1. Then, Link Partner 1 may start sending training frames, e.g., Clause 72 frames, to Link Partner 2 through transmitter 1. Similarly, the recovery logic 140 of Link partner 2 may enable transmitter 2 at time t4, which may be 70 ms after transmitter 2 was disabled at time t2. Then, Link Partner 2 may start sending training frames to Link Partner 1 through transmitter 2, as seen starting at time t4 in the example shown in FIG. 3.

As one exemplary implementation, recovery logic 140 implemented in a link partner may identify a loss of signal event and disable its respective transmitter within a time period specified by a synchronization threshold parameter 163. For example in FIG. 3, the time between time t1, when transmitter 1 ceased driving a communication line resulting in a LOS event, and time t2, when the recovery logic 140 of Link Partner 2 disables transmitter 2 in response to the LOS event, may be less than the synchronization threshold parameter 163. When the link partners disable their respective transmitters for an equal recovery duration, then the transmitters of the link partners may also be enabled within the time period specified by the synchronization threshold parameter as well, e.g., the time between t3 and t4 is less than the synchronization threshold parameter 163. Likewise, the time between when Link Partner 1 and when Link Partner 2 start send training protocol data (seen in FIG. 3 as the time between t3 and t4) may also be less than a synchronization threshold parameter as well. Thus, a switch device may configure the synchronization threshold parameter 163 to ensure link partners begin sending training protocol communications to each other within a predetermined time period. As examples, the synchronization threshold parameter may be set to 5 ms or 10 ms to ensure the exchange of training frames between Link Partners 1 and 2 starts within a predetermined time frame.

As one example, a link partner may be operable to detect a loss of signal event within a few hundred nanoseconds (ns), which may be significantly shorter than a synchronization threshold parameter of, for example, 5 ms or 10 ms. In FIG. 3, the time between the disabling of transmitter 1 at t1 and the disabling of transmitter 2 at t2 may be less than 1 ms. As such, the time between enabling transmitter 1 at time t3 and the enabling of transmitter 2 at time t4 may be less than 1 ms as well. Continuing the example, the time from when Link Partner 1 starts to send training frames to Link Partner 2 (t3) and when Link Partner 2 starts to send training frames to Link Partner 1 (t4) may also be less than 1 ms. Thus, the respective recovery logic 140 of Link Partners 1 and 2 may synchronize the start of performing a training protocol communication between the two link partners. The synchronized start between Link Partners 1 and 2 may ensure the independent disabling of transmitters for each Link Partner was sufficient in length to ensure a proper reconfiguration of the communication link, e.g., long enough to clear any residual data on the communication line.

As described above, the respective recovery logic 140 of Link Partners 1 and 2 may synchronize a link restart process and training protocol exchange without performing a speed negotiation between the link partners. The recovery logic 140 of Link Partners 1 and 2 may also forego sending control information to the remote link partner during the restart process. That is, the recovery logic 140 may perform a restart process upon identifying a LOS event without informing a remote link partner, e.g., without using generators or detectors of a communication protocol to initiate a restart process with the remote link partner.

Figure 4:
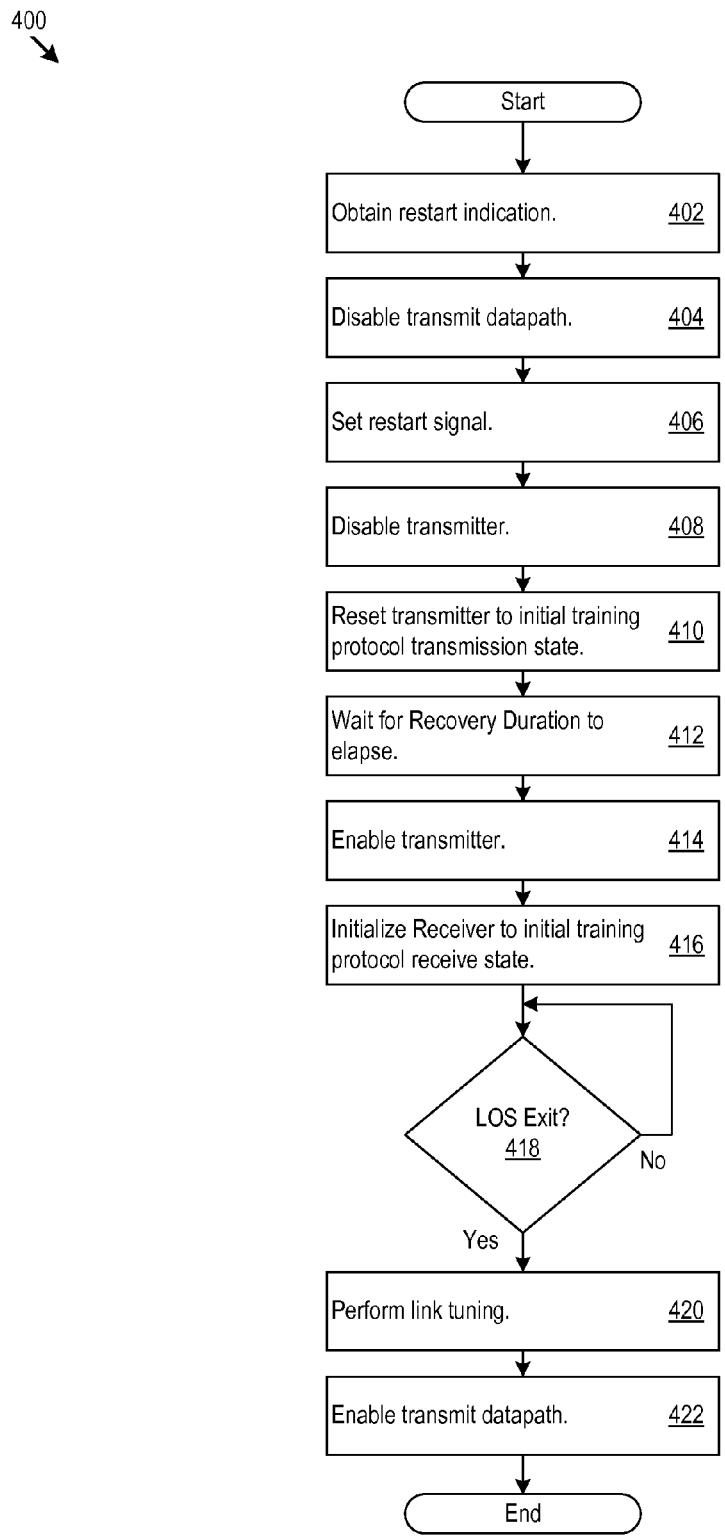
FIG. 4 shows an example of logic that a link partner may implement as hardware, software, or both.

FIG. 4 shows an example of logic 400 that a link partner may implement as hardware, software, or both. For example, the recovery logic 140 may implement the logic 400 as hardware, software, or both. In one implementation, the recovery logic 140 is implemented as a microcontroller in a SerDes device that may include firmware instructions and a microprocessor.

The recovery logic 140 may begin a link restart process in the link partner upon obtaining a reset indication (402). The recovery logic 140 may obtain a reset indication internally, e.g., by identifying a loss of signal event on a communication link with a remote link partner. Alternatively, the recovery logic 140 may receive a restart indication from logic external to the link partner, such as management logic of a device containing the link partner. The recovery logic 140 may receive a reset signal from the management logic instructing the link partner to reset the communication link, such as when the management logic identifies that data received through the communication fails a quality criterion. As another example, the management logic may instruct the link partner to perform a link restart process to reconfigure a communication link after the link partner completes a restart, e.g., after a user requested restart of the SerDes.

The recovery logic 140 may then disable downstream processing in a link partner until the communication link with the remote link partner has been reestablished and configured.

For example, the link partner may disable a transmit datapath (404) that processes data received by the link partner, e.g., the receive datapaths 234 or 254 shown in FIG. 2. In one implementation, the recovery logic 140 may then set a restart signal (406) to indicate that the link partner has entered a link restart process, e.g., a pmd_restarted signal. The restart signal may be sent and used by management logic when determining restart conditions of a link partner. Management logic external to a link partner is described in greater detail in FIGS. 6 and 7 below.

The recovery logic 140 may then disable the transmitter (408) of the link partner communicating with the remote link partner. The recovery logic 140 may also reset the transmitter to an initial training protocol transmission state (410). The transmitter reset may include resetting any combination the amplitude, pulse shape, and initial transmission values of the transmitter to predetermined initial values to control the initial data sent by the transmitter after re-enabling. In one implementation, the recovery logic 140 may reset the transmitter to an initial state of a state machine associated with the transmitter.

The recovery logic 140 may then wait for the recovery duration to elapse (412), whereupon the recovery logic 140 may enable the transmitter (414). Upon enablement, the transmitter may transmit a signal as specified by an initial transmission state. For example, the transmitter may drive the communication link that transmits data to the remote link partner by sending training frames, e.g., clause 72 frames. Upon expiration of the recovery duration, the recovery logic 140 may also configure a receiver of the link partner to an initial training protocol receive state (416). For example, the recovery logic 140 may reset the receiver by configuring the receiver to expect certain data from a transmitter, e.g., data of a predetermined amplitude, pulse shape, or including predetermined initial values. In one implementation, the recovery logic 140 may reset the receiver to an initial state of a state machine associated with the receiver.

In one implementation, the recovery logic 140 may delay performing a link tuning procedure until the loss of signal event is resolved, e.g., when a communication link becomes active. For example, the recovery logic 140 may identify when a loss of signal condition is no longer present (418), which may be referred to a LOS exit condition. The recovery logic 140 may identify a LOS exit condition by monitoring the communication link through which traffic is received from the remote link partner. As one example, the recovery logic 140 may identify a LOS exit condition when the remote link partner sends traffic to the link partner. As soon as the recovery logic 140 identifies activity in the receiver of the link partner (e.g., the receiver of the link partner is receiving data from the remote link partner), the recovery logic 140 may identify that the loss of signal condition is no longer present.

Upon identifying a LOS exit condition, the recovery logic 140 may perform a link tuning with the remote link partner (420). During the link tuning, the transmitter of a link partner may send training protocol frames, e.g., Clause 72 frames, to a remote link partner in order to configure the communication link. The link partner may also receive training protocol frames sent from the remote link partner as well. The link partner may tune a receiver, transmitter or both according to the training protocol frames. After the communication link is configured and the link tuning has been completed, the recovery logic 140 may enable the downstream processing in the link partner, e.g., the receive datapaths 234 or 254. In one implementation, the recovery logic 140 may send an indication that the link tuning has completed to external logic, e.g., management logic. The recovery logic 400 may perform a link restart process by performing any of the elements of the exemplary logic 400 discussed above.

Figure 5:
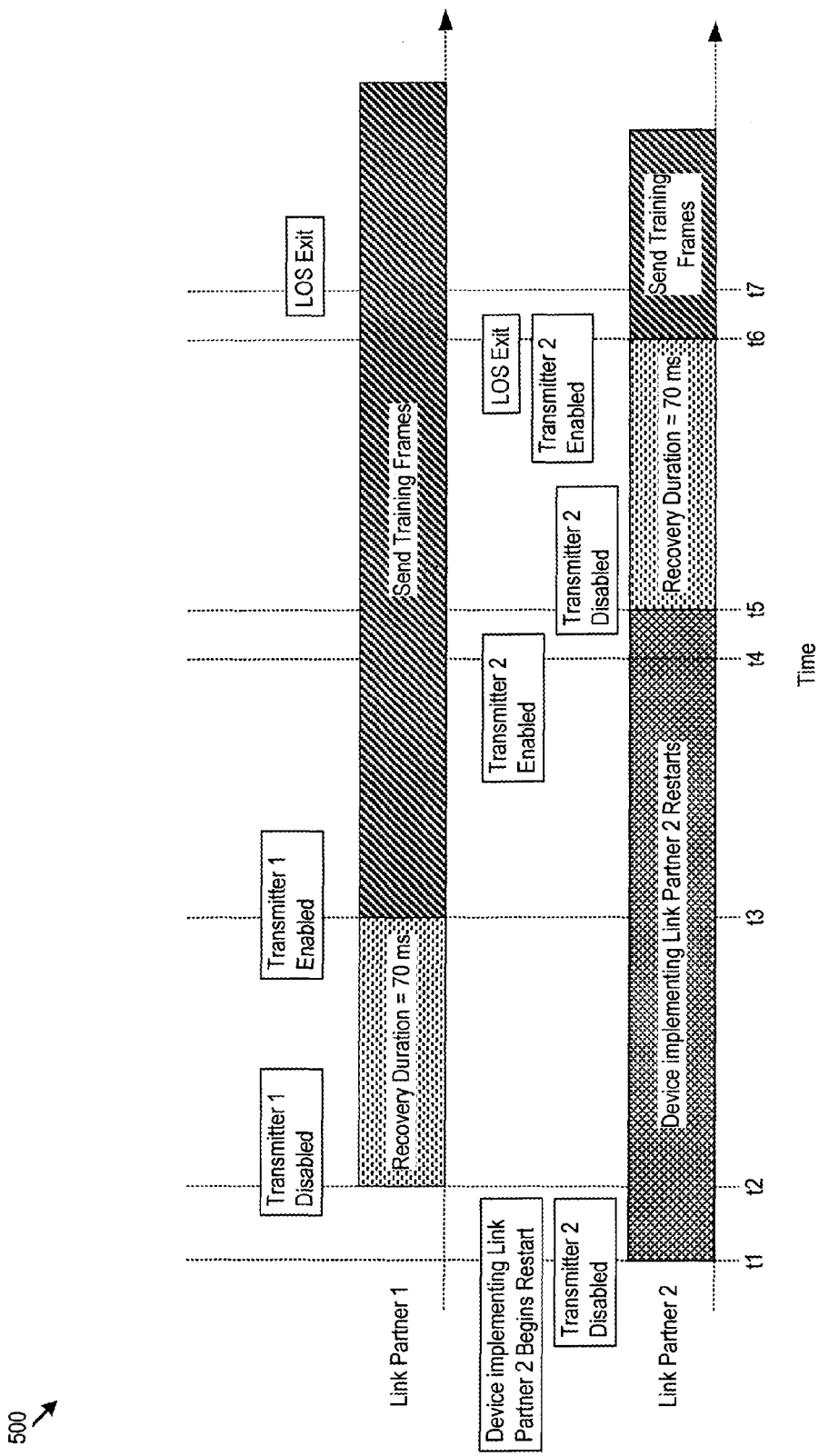
FIG. 5 shows a timing example of a link restart process performed by link partners.

FIG. 5 shows another timing example 500 of a link restart process performed by link partners. The timing example 500 shown in FIG. 5 depicts the timing of a first link partner labeled as Link Partner 1 and a second link partner labeled as Link Partner 2. Link Partner 1 and Link Partner 2 may be communicatively linked, for example via a full duplex link. Each link partner may also implement recovery logic 140, e.g., by implementing any portion of the logic 400 described in FIG. 4.

At a time t1, a device implementing Link Partner 2 may reset. For example, a switch device, fabric card, or server blade implementing Link Partner 2 may reset, thus disabling transmitter 2 of Link Partner 2. During the restart process of the device implementing Link Partner 2, Link Partner 2 may cease transmitting traffic to Link Partner 1 via a communication link. As such, recovery logic 140 of Link Partner 1 may recognize a loss of signal event and disable transmitter 1 of Link Partner 1 at a time t2. The recovery logic 140 of Link Partner 1 may disable transmitter 1 for a recovery duration, which is 70 ms in FIG. 5.

At a time t3 when the 70 ms recovery duration elapses, the recovery logic 140 of Link Partner 1 may enable transmitter 1 and reset a receiver of Link Partner 1 to an initial training protocol receive state. At time t3, a device implementing Link Partner 2 may still be in the process of restarting and the communication line through which Link Partner 2 transmits data to Link Partner 1 may remain in a high impedance state because transmitter 2 of Link Partner 2 is still powered down. At time t3, transmitter 1 may send traffic, e.g., training frames, to Link Partner 2 and monitor a receiver of Link Partner 1 to identify a LOS exit condition, e.g., when traffic is received by the receiver of Link Partner 1.

At time t4, the device implementing Link Partner 2 may drive power, e.g., voltage, to physical devices implementing Link Partner 2, thus enabling transmitter 2. The device implementing Link Partner 2 may complete its restart process at a time t5. As part of or in addition to the restart process, the device may instruct Link Partner 2 to reestablish communication with Link Partner 1. For example, upon restarting, external management logic may instruct Link Partner 2 to recover the communication link with Link Partner 1. In response, the recovery logic 140 of Link Partner 2 may disable transmitter 2 of Link Partner 2 at time t5 for a recovery duration of 70 ms. At time t6, the recovery logic 140 of Link Partner 2 may enable transmitter 2 and reset the receive state of a receiver of Link Partner 2. As Link Partner 1 has been transmitting training frame traffic to Link Partner 2, the recovery logic 140 of Link Partner 2 may identify a LOS exit condition upon initializing the receiver of Link Partner 2, e.g., at a time t6 in FIG. 5. Then, Link Partner 2 may start sending training frames to Link Partner 1 at time t6.

After returning to an active state at time t6, transmitter 2 may drive a communication link to Link Partner 1, e.g., by sending a training protocol communication. Then, the recovery logic 140 of Link Partner 1 may identify activity in the receiver of Link Partner 1, and determine an LOS exit condition at a time t7. Then, Link Partner 1 may start sending training frames to Link Partner 2. At time t7, Link Partner 1 and 2 may have both identified a LOS exit condition and the respective recovery logic 140 of Link Partners 1 and 2 may synchronize the performing of a link tuning action. Moreover, the respective recovery logic 140 of Link Partners 1 and 2 may synchronize a link restart process and training protocol communication without performing a speed negotiation between the link partners. In this way, the Link Partners 1 and 2 may also reset their respective transmitter and receiver to an initial state without communicating control information to the remote link partner prior. Thus, both Link partner 1 and Link Partner 2 may identify a LOS event and perform a link restart process without using additional communication protocol to initiate the restart process.

Figure 6:
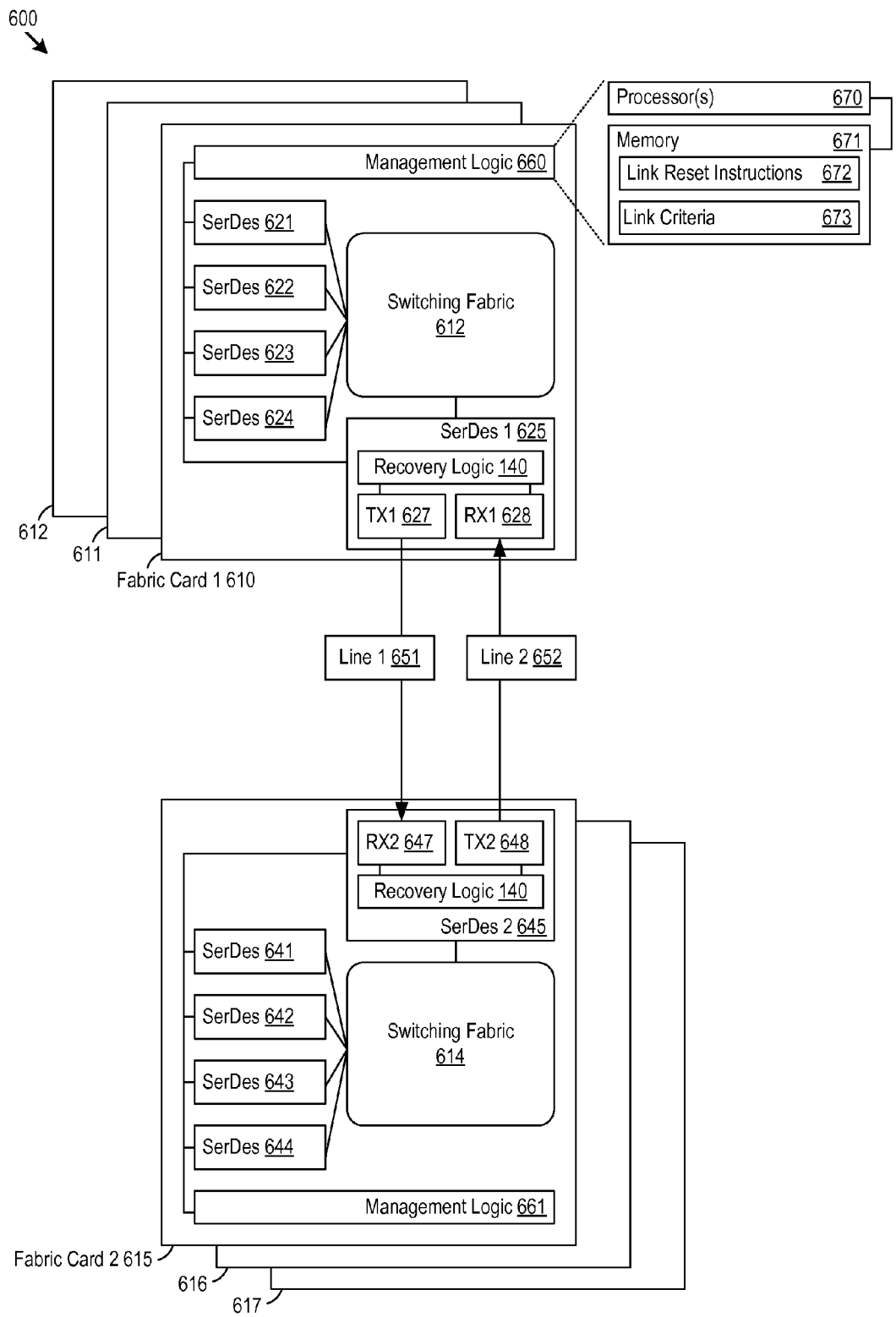
FIG. 6 shows an example of a system for restarting a communication link that fails link criteria.

FIG. 6 shows an example of a system 600 for restarting a communication link that fails link criteria. The system 600 may be implemented as part of a switch device or switching system. The system 600 may include any number of fabric cards integrated across any number of switching devices. In the example shown in FIG. 6, the system 600 includes fabric card 1 610 and fabric cards 611-612 as well as fabric card 615 and fabric cards 616-617. In one implementation, fabric cards 610-612 may be integrated as part of a first switch on a first rack in a switching system and fabric cards 615-617 may be integrated as part of a second switch on a second rack in the switching system.

A fabric card may include a switching fabric and one or more of link partners, e.g., SerDes devices. Fabric card 1 610 in FIG. 6 includes switching fabric 612 that may interconnect any number of link partners, such as SerDes devices 621-625. The SerDes devices shown in FIG. 6 may share common characteristics and functionality with any of the SerDes devices described above. As seen in FIG. 6, SerDes device 1 625 includes transmitter 1 627, receiver 1 628, and recovery logic 140. Fabric card 2 615 may also include switching fabric 614 that may interconnect any number of link partners, such as SerDes devices 641-645. As seen in FIG. 6, fabric card 2 615 includes SerDes device 2, which includes receiver 2 647, transmitter 2 648, and recovery logic 140.

SerDes device 1 625 may be communicatively coupled to SerDes device 2 645 through one or more communication links. In the exemplary system 600, SerDes device 1 625 is connected to SerDes device 2 through a full duplex link that includes communication line 1 651 and communication line 2 652. In one example, communication lines 1 and 2 may be implemented as part of a backplane, e.g., the backplane 215. SerDes device 1 625 may send traffic through transmitter 1 627 across communication line 1 651 to receiver 2 647 of SerDes device 2 645. SerDes device 2 645 may send traffic through transmitter 2 647 across communication line 2 652 to receiver 1 627 of SerDes device 1 625. The recovery logic 140 of SerDes devices 1 and 2 may identify a loss of signal event and automatically perform a signal restart process to restore the communication link with the other SerDes device without performing a speed negotiation in any of the ways described above.

The system 600 may include management logic 660 that may determine a loss of link event, e.g., by monitoring any number of criteria for one or more communication links. In one implementation, the management logic 660 may monitor data received by link partners in a fabric card or switching device. For example, the management logic 660 may monitor Physical Coding Sublayer (PCS) transactions and identify when data received from a communication link fails one or more link criteria. Link criteria may include, as an example, any number of quality metrics such as a proper communication protocol, an error threshold, or others. For example, the link criteria may include when a link indicator from a PCS block has exceeded a predetermined criteria threshold, such as the PCS blocks specified in IEEE 802.3 clauses 36, 49, 82, and others. Also, the link criteria may include PCS protocol violations, e.g., when coding block errors exceed a predefined error threshold. Or, as another example, the link criteria may include when protocol elements of data received from the communication link exceeds a predetermined threshold, e.g., when packet CRC checks of Ethernet packet traffic exceeds an error threshold.

In FIG. 6, fabric card 1 610 includes management logic 660 that may monitor any number of SerDes devices contained in the fabric card, SerDes devices 621-625, and any number of communication links which the SerDes devices receive traffic. Fabric card 2 615 includes management logic 661 that may perform a similar monitoring of SerDes devices and communication links associated with fabric card 2 615. The management logic 660 and 661 may identify when data received by a respective SerDes device fails one or more link criteria.

In one implementation, the management logic 660 may include one or more processors 670 and a memory 671 storing link reset instructions 672 and link criteria 673. Link criteria may vary from between implementations of management logic. For example, the link criteria 673 of the management logic 660 implemented in fabric card 1 610 may differ from the link criteria implemented in the management logic 661 of fabric card 2 615.

The management logic 660 of fabric card 1 610 may monitor communication line 2 652 that links SerDes device 1 625 (receiving traffic) and SerDes device 2 645 (sending traffic). As one example, the management logic 660 may identify a loss of link event, which may identify when a communication link or traffic received via the communication link fails a link criteria. The management logic 660 may identify a loss of link event when traffic received by SerDes device 1 625 from SerDes 2 device 2 645 via communication line 2 652 fails a link protocol criteria, a link quality criteria, or other criteria. Any number of circumstances may influence the integrity of a datastream and cause a loss of link event. Examples include when a transmitter becomes misconfigured, switch temperatures fluctuate, a power surge occurs on a switch rack, or any number of other circumstances. As another example, an LOS event, e.g., when a remote link partner performs a link restart process, may also immediately or eventually result in a loss of link event on the communication link. In one implementation, the management logic 660 may perform an analysis on traffic received from a remote link partner to identify when the received traffic fails a link criteria. In another implementation, a link partner may include logic that performs the received traffic analysis according to the link criteria and sends an indication to the management logic 660 when a loss of link event is identified.

In one implementation, the management logic 660 may respond to a loss of link event by sending a restart indication to a local link partner. In another implementation, the management logic 660 may respond to a loss of link event based on whether the loss of link event was caused by a loss of signal. To do so, the management logic 660 may maintain a restarted parameter for each of the link partners monitored by the management logic 660, for example as a variable in memory. The management logic 660 may clear the restarted parameter when traffic received by a link partner from a remote link partner satisfies the link criteria. The management logic 660 may also receive a restarted signal, e.g., pmd_restarted, from the recovery logic 140 of a local link partner whenever the local link partner initiates a link restart process, e.g., when the recovery logic 140 of the local link partner identifies a loss of signal event. In response to receiving the restarted signal from the recovery logic 140, the management logic 660 may set the restarted parameter of the local link partner, e.g., to a value of 1. Upon identifying a loss of link event, the management logic 660 may access the restarted parameter of the local link partner to determine how to respond.

To illustrate, the management logic 660 of fabric card 1 610 may identify a loss of link event on communication line 2 652 when traffic received by receiver 1 628 via communication line 2 652 fails a link criteria. In the current illustration, the management logic 660 may identify a loss of link event while receiver 1 628 continues to receive data from transmitter 2 648 of SerDes device 2, e.g., not a loss of link event caused by a loss of signal. The management logic 660 of fabric card 1 610 may then access the restart parameter of SerDes device 1 and determine that SerDes device 1 has not initiated a restart process prior to the management logic 660 identifying the loss of link event. Then, the management logic 660 may instruct SerDes 1 625 to perform a link restart process, for example as described in FIG. 4 above.

While restarting, transmitter 1 627 of SerDes device 1 625 may be disabled for a recovery duration, causing a loss of signal on communication line 1 651. The recovery logic 140 of SerDes device 2 645 may identify a LOS event and initiate a link restart process. The recovery logic 140 may also send a restarted signal to the management software 661 of fabric card 2 615 whereupon the management software 661 may update the restarted parameter of SerDes device 2 645. The loss of signal on communication line 1 651 may also result in a loss of link event at a subsequent time. For example, the link criteria of the management logic 661 may include exceeding an error threshold, and the management logic 661 may not identify a loss of link event arising from the loss of signal on communication line 1 651 until the error threshold is exceeded. Upon identifying the loss of link event on communication line 1 651, the management logic 661 of fabric card 2 615 may access the restarted parameter of SerDes device 2 645 and determine that SerDes device 2 645 initiated a link restart process prior to the loss of link event. In other words, the management logic 661 may determine that SerDes device 2 645 restarted in response to SerDes 1 625 restarting. Thus, the management logic 661 may forego instructing SerDes 2 645 to restart and instead wait until a communication link is reestablished with SerDes 1 625.

The recovery logic 140 of a link partner and the management logic 660 of a fabric card or switch may allow for a synchronized start of a training protocol communication between the link partner and a remote link partner. The recovery logic 140 may monitor physical medium dependent (PMD) level events, such as a loss of signal. The management logic 660 may monitor PCS level events, such as a loss of link. Thus, the recovery logic 140 and management logic 660 may support automatic recovery from a loss of signal event and/or loss of link event through a link restart process, including the synchronized start of training protocol communications without performing a speed negotiation between the link partner and the remote link partner.

Figure 7:
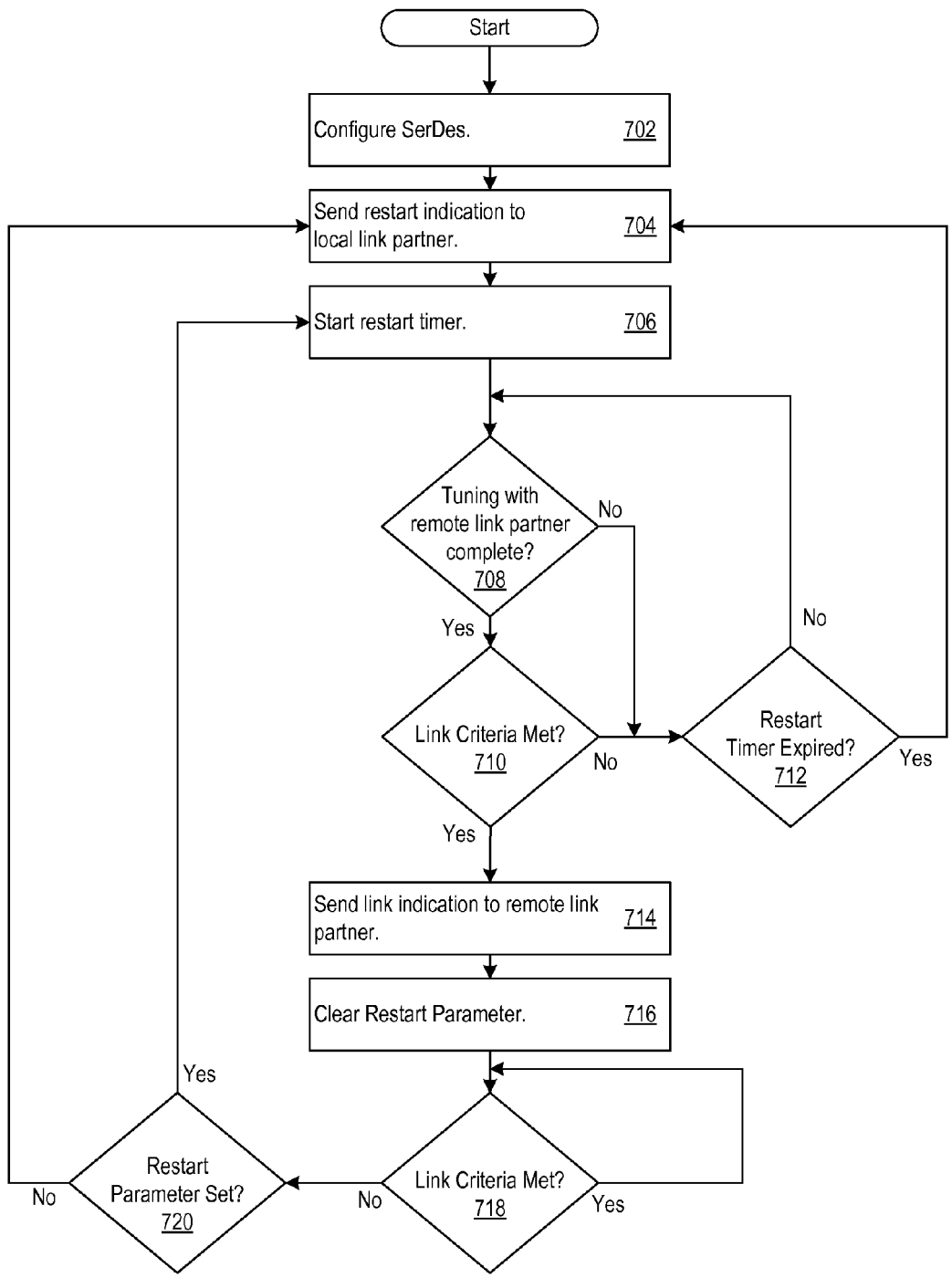
FIG. 7 shows an example of logic that a switch device may implement as software, hardware, or both.

FIG. 7 shows an example of logic 700 that a switch device may implement as software, hardware, or both. For example, the logic 700 may be implemented as logic external to a link partner, such as the management logic 660 or 661. When a device (e.g., a fabric card or switch) implementing the management logic 660 resets, the management logic 660 may configure any number of link partners on the device, e.g., local link partners. For example, the management logic 660 may configure any number of SerDes devices on a fabric card (702) by enabling particular features of the SerDes or configuring a communication speed of the SerDes.

Once configuration of a local link partner completes, the management logic 660 may send a restart indication to the local link partner (704), for example to establish or re-establish a communication link with a remote link partner. The management logic 660 may also start a restart timer (706). Then, the management logic 660 may identify when tuning of the communication link with the remote link partner completes (708), which may indicate the local link partner and remote link partner have completed a training protocol handshake, e.g., Clause 72 exchange. In one implementation, the management logic 660 may receive a signal from the local link partner indicating that the link tuning has completed. The local link partner may then receive traffic from the remote link partner over the communication link, and the management logic 660 may identify when the received traffic meets link criteria (710). In one implementation, the remote link partner may send idle traffic, idle characters, to the local link partner, which may allow the management logic 660 to determine if the received idle traffic meets the link criteria. In this example, the remote link partner may forego sending network traffic, e.g., network data sent from an end device, until the management logic 660 determines traffic received from the remote link partner meets the link criteria.

The restart timer may specify when the management logic 660 should restart a local link partner if the link tuning fails to complete or if the received traffic fails to meet the link criteria in a predetermined time period. When the restart timer expires before management logic 660 identifies that the link tuning has completed or the received traffic meets the link criteria (712), the management logic 660 may send a restart indication to the local link partner (704). In one implementation, if the number of restart timer expirations exceeds a predetermined threshold, the management logic 660 may determine that a configuration issue exists, e.g., the local link partner and remote link partner are configured at different speeds and cannot complete the link tuning. The management logic 660 may perform a repair action, such as reconfiguring the local link partner.

When traffic received from a remote link partner meets the link criteria, the management logic 660 may send a link indication to the remote link partner (714). For example, the management logic 660 may instruct the local link partner to send a control word to the remote link partner indicating that the received traffic meets the link criteria. In one implementation, the remote link partner may cease sending only idle traffic and start sending network data to the local link partner upon receiving the link indication. The management logic 660 may also clear the reset parameter of the local link partner once the received traffic meets the link criteria (716). The management logic 660 may continue to monitor whether traffic received from the remote link partner meets the link criteria (718). In other words, the management logic 660 may determine if a loss of link event occurs.

Upon identifying a loss of link event, the management logic 660 may respond based on whether the restart parameter of the local link partner is set. The local link partner may send a restarted signal to the management logic 660 whenever the local link partner restarts, e.g., when a LOS signal is identified. In response the management logic 660 may update the restarted parameter of the local link device. Upon determining received traffic has failed the link criteria, the management logic 660 may access the restarted parameter of the local link partner (720). If the restarted parameter has been set, the management logic 660 may start a restart timer and identify when link tuning with a remote link partner has completed and when received traffic meets the link criteria. If the restarted parameter has not been set, the management logic may send a restart indication to the local link partner to address the loss of link event.

The methods, devices, and logic described above may be implemented in many different ways in many different combinations of hardware, software or both hardware and software. For example, all or parts of the system may include circuitry in a controller, a microprocessor, or an application specific integrated circuit (ASIC), or may be implemented with discrete logic or components, or a combination of other types of analog or digital circuitry, combined on a single integrated circuit or distributed among multiple integrated circuits. All or part of the logic described above may be implemented as instructions for execution by a processor, controller, or other processing device and may be stored in a tangible or non-transitory machine-readable or computer-readable medium such as flash memory, random access memory (RAM) or read only memory (ROM), erasable programmable read only memory (EPROM) or other machine-readable medium such as a compact disc read only memory (CDROM), or magnetic or optical disk. Thus, a product, such as a computer program product, may include a storage medium and computer readable instructions stored on the medium, which when executed in an endpoint, computer system, or other device, cause the device to perform operations according to any of the description above.

The link recovery processing described above may be distributed among multiple system components, such as among multiple processors and memories, optionally including multiple distributed processing systems. Parameters, databases, and other data structures may be separately stored and managed, may be incorporated into a single memory or database, may be logically and physically organized in many different ways, and may implemented in many ways, including data structures such as linked lists, hash tables, or implicit storage mechanisms. Programs may be parts (e.g., subroutines) of a single program, separate programs, distributed across several memories and processors, or implemented in many different ways, such as in a library, such as a shared library (e.g., a dynamic link library (DLL)). The DLL, for example, may store code that performs any of the system processing described above. While various embodiments of the invention have been described, it will be apparent to those of ordinary skill in the art that many more embodiments and implementations are possible within the scope of the invention. Accordingly, the invention is not to be restricted except in light of the attached claims and their equivalents.

What is claimed is:

1. A method comprising:
    in a switch device:
    receiving, by a receiver of a first link partner, data transmitted by a transmitter of a second link partner, identifying, by the receiver, a signal parameter of the received data not satisfying a predetermined threshold, and in response to the signal parameter not satisfying the predetermined threshold;
    automatically performing, by the first link partner, a link restart process to configure and restore a communication link with the second link partner using a training protocol frame, where the link restart process executes without performing a speed negotiation with the second link partner and comprises:
    restarting a transmitter of the first link partner to an initial transmit state after a predetermined period of time by resetting transmission values of the transmitter to predetermined initial values; and
    transmitting the training protocol frame for receipt by the second link partner using the initial transmit state.

2. The method of claim 1, where the signal parameter of the received data comprises a signal amplitude, a signal shape, a signal timing, or a signal dispersion parameter, or a combination thereof.

3. The method of claim 1, where automatically performing the link restart process comprises: disabling the transmitter of the first link partner for a predetermined recovery duration, which results in a receiver of the second link partner also being disabled for said predetermined recovery duration.

4. The method of claim 3, where automatically performing the link restart process further comprises:
    enabling the transmitter of the first link partner after the predetermined recovery duration elapses to synchronize transmission of the training protocol frame to the second link partner, the second link partner also being enabled following the predetermined recovery duration.

5. The method of claim 1, further comprising: performing, by the first link partner, after restoring the communication link, a training protocol communication by exchanging the training protocol frame with the second link partner before performing the speed negotiation with the second link partner.

6. The method of claim 1, where the initial transmit state comprises resetting a configuration of the first link partner to transmit data using a predetermined amplitude, and a predetermined pulse shape to control initial data sent by the transmitter of the first link partner after restart.

7. The method of claim 1, where upon restarting, the receiver of the first link partner is set to an initial receive state.

8. The method of claim 1, further comprising exchanging, by the first link partner, training and configuration parameters, with the second link partner, in a training protocol communication using the training protocol frame to configure the communication link.

9. A device comprising:
    a communication interface circuitry including a transmitter and a receiver; and
    recovery logic circuitry in communication with the communication interface circuitry, the recovery logic circuitry configured to:
    monitor data received at the receiver,
    identify a signal parameter of the received data not satisfying a predetermined threshold, and in response:
    force the transmitter into an idle state; wait for a recovery duration to elapse, and after the recovery duration has elapsed;
    enable the transmitter into an active state by restart of the transmitter to an initial transmit state, wherein the initial transmit state comprises a reset of the transmitter to predetermined initial transmission values; and reestablish communication through the transmitter and the receiver with a remote link partner by communication of a training protocol frame according to the initial transmit state, without first communicating a speed negotiation frame with the remote link partner, the training protocol frame communicated to perform communication link tuning with the remote link partner.

10. The device of claim 9, where the recovery logic circuitry is further configured to stop processing received data after identifying the signal parameter of the received data as not satisfying the predetermined threshold.

11. The device of claim 10, where the recovery logic circuitry is further configured to resume processing the received data after reestablishment of communication and completion of the communication link tuning.

12. The device of claim 9, where the recovery logic circuitry is further configured to restart the receiver into an initial receive state after the recovery duration has elapsed, where the receiver in the initial state receives data of a predetermined amplitude, and a predetermined pulse shape.

13. The device of claim 9, where the recovery logic circuitry is further configured to configure the transmitter in the initial transmit state prior to forcing the transmitter into an idle state.

14. The device of claim 9, where the recovery logic circuitry is configured to reestablish communication with the remote link partner without communication of control information to the remote link partner.

15. The device of claim 9, where the communication interface circuitry and the remote link partner are in communication interfaces in a single network switch device.

16. A device comprising:
a Serializer/Deserializer (SerDes) device;
a memory comprising an error threshold; and
management logic circuitry in communication with the SerDes device, the management logic circuitry configured to:
identify that data received by the SerDes device exceeds the error threshold, and in response:
send a restart indication to the SerDes device to perform a link restart process to restore communication with a remote SerDes device, the link restart process comprises a restart of a transmitter of the SerDes device and reset of transmission parameters of the transmitter to a predetermined initial transmit state after a predetermined period of time that causes the remote SerDes device to restart a transmitter of the remote SerDes device after said predetermined period of time, and
upon the restart, transmit, by the transmitter of the SerDes device, in accordance with the predetermined initial transmit state, an Ethernet frame of the SerDes device to the remote SerDes device to configure a full-duplex communication link for communication without performance of a speed negotiation with the remote SerDes device, the Ethernet frame comprising training parameters.

17. The device of claim 16, where the management logic circuitry is further configured to: identify when the SerDes device completes the link restart process.

18. The device of claim 17, where the management logic circuitry is further configured to: identify when traffic received by the SerDes device after completion of the link restart process meets the error threshold.

19. The device of claim 18, where the management logic circuitry is further configured to: after identifying when traffic received by the SerDes device after completion of the link restart process meets the error threshold: send a link indication to the remote SerDes device indicating that the traffic meets the error threshold.

20. The device of claim 16, wherein the Ethernet frame comprises a training protocol frame used in training protocol communications to exchange training and configuration parameters and configure the full-duplex communication link.

* * * * *

UNITED STATES PATENT AND TRADEMARK OFFICE
CERTIFICATE OF CORRECTION

PATENT NO.         : 9,331,922 B2                                        Page 1 of 1
APPLICATION NO.    : 13/571964
DATED              : May 3, 2016
INVENTOR(S)        : Vivek Venkatraman et al.

It is certified that error appears in the above-identified patent and that said Letters Patent is hereby corrected as shown below:

In the Claims

Col. 13, line 66, delete "forreceipt" and insert --for receipt--

Signed and Sealed this
Twenty-eighth Day of June, 2016

Michelle K. Lee
*Director of the United States Patent and Trademark Office*